(12) United States Patent
Lee et al.

(10) Patent No.: US 12,380,890 B2
(45) Date of Patent: Aug. 5, 2025

(54) METHOD, SYSTEM, AND NON-TRANSITORY COMPUTER READABLE RECORD MEDIUM TO RECORD CONVERSATIONS IN CONNECTION WITH VIDEO COMMUNICATION SERVICE

(71) Applicants: NAVER CORPORATION, Seongnam-si (KR); LINE WORKS CORP., Tokyo (JP)

(72) Inventors: SuMee Lee, Seongnam-si (KR); Jieun Shin, Seongnam-si (KR); Ye Lim Jeong, Seongnam-si (KR); Gilhwan Hwang, Seongnam-si (KR)

(73) Assignees: NAVER CORPORATION, Seongnam-si (KR); LINE WORKS CORP., Tokyo (JP)

( * ) Notice: Subject to any disclaimer, the term of this patent is extended or adjusted under 35 U.S.C. 154(b) by 377 days.

(21) Appl. No.: 17/508,415

(22) Filed: Oct. 22, 2021

(65) Prior Publication Data
US 2022/0130393 A1   Apr. 28, 2022

(30) Foreign Application Priority Data

Oct. 23, 2020  (KR) .................. 10-2020-0138244

(51) Int. Cl.
*G10L 15/26*   (2006.01)
*G10L 15/30*   (2013.01)
(Continued)

(52) U.S. Cl.
CPC .............. *G10L 15/26* (2013.01); *G10L 15/30* (2013.01); *H04L 12/1831* (2013.01); *H04L 51/02* (2013.01)

(58) Field of Classification Search
CPC ..... G10L 15/26; G10L 15/30; H04L 12/1831; H04L 51/02; H04N 7/141; H04N 7/15; H04N 21/4788
See application file for complete search history.

(56) References Cited

U.S. PATENT DOCUMENTS 7,459,898 B1 * 12/2008 Woodings .............. G01R 23/16
                                                                                370/254
10,742,695 B1    8/2020 Brown et al.
(Continued)

FOREIGN PATENT DOCUMENTS

CN     106462573 A    2/2017
JP     2017525167 A   8/2017
(Continued)

OTHER PUBLICATIONS

Office Action issued in corresponding to Japanese patent application No. 12021-14194, dated Sep. 20, 2022.
(Continued)

*Primary Examiner* — Darioush Agahi
(74) *Attorney, Agent, or Firm* — GREER BURNS & CRAIN, LTD.

(57) ABSTRACT

Provided is a method, system, and non-transitory computer-readable record medium to record a conversation, between multiple users, in connection with a video communication service. An audio record management method includes creating an audio record by converting an audio of a video communication channel to a text; and providing the audio record to a user that participates in the video communication channel.

13 Claims, 13 Drawing Sheets

(51) Int. Cl.
   *H04L 12/18*     (2006.01)
   *H04L 51/02*     (2022.01)

(56) References Cited

U.S. PATENT DOCUMENTS

| | | | | |
|---|---|---|---|---|
| 2011/0040834 A1* | 2/2011 | Schaefer | ............ | G06Q 10/1095 |
| | | | | 709/204 |
| 2018/0191907 A1* | 7/2018 | Herrin | ................ | H04L 12/1831 |
| 2019/0349321 A1* | 11/2019 | Cai | ........................ | G06N 3/006 |
| 2020/0044998 A1* | 2/2020 | Jeon | ..................... | H04L 51/046 |
| 2020/0252442 A1* | 8/2020 | Brown | ................ | H04L 12/1818 |
| 2022/0078139 A1* | 3/2022 | Sreenivasan | ............ | G16H 80/00 |
| 2022/0321619 A1* | 10/2022 | Brown | .................... | H04L 51/02 |

FOREIGN PATENT DOCUMENTS

| | | | |
|---|---|---|---|
| JP | 2019061594 A | | 4/2019 |
| JP | 2019533268 A | | 11/2019 |
| KR | 1020140062217 A | | 5/2014 |
| KR | 1020150135055 A | | 12/2015 |

OTHER PUBLICATIONS

Office Action issued in corresponding to Japanese patent application No. 2021-14194, dated Feb. 1, 2022.
Office Action issued in corresponding Korean patent application No. 10-2020-0138244, dated Nov. 29, 2021.
Office Action issued in corresponding to Taiwanese patent application No. 110138547, dated Jun. 29, 2022.

* cited by examiner

FIG. 5

500 {
- ○ Note bot ~ 501 ☑
- ○ User1 ☐
- ○ User2 ☐
- ○ User3 ☐
- ○ User4 ☐
- ○ Group1 ☑
- ○ Group2 ☐
- ○ Group3 ☐

< Invite

Cancel | Add

METHOD, SYSTEM, AND NON-TRANSITORY COMPUTER READABLE RECORD MEDIUM TO RECORD CONVERSATIONS IN CONNECTION WITH VIDEO COMMUNICATION SERVICE

CROSS-REFERENCE TO RELATED APPLICATION(S)

This U.S. non-provisional application claims the benefit of priority under 35 U.S.C. § 119 to Korean Patent Application No. 10-2020-0138244 filed on Oct. 23, 2020, in the Korean Intellectual Property Office (KIPO), the entire contents of which are incorporated herein by reference.

BACKGROUND OF THE INVENTION

Field of Invention

One or more example embodiments of the following description relate to technology to record conversational speech as a text.

Description of Related Art

In general, mobile audio conversion technology may record audio, for example, speech, on a mobile device and, when the audio recording is completed, may convert the audio of a recorded section to a text and may display the converted text on a display.

As an example of the audio conversion technology, technology for performing an audio recording and a text conversion is disclosed in Korean Patent Laid-Open Publication No. 10-2014-0062217 published on May 23, 2014.

BRIEF SUMMARY OF THE INVENTION

One or more example embodiments provide a method and system that may automatically record a conversation in connection with a video communication service such as a video call or a video conference.

One or more example embodiments also provide a method and system that may record conversational speech of a video communication channel as a text through speech recognition technology.

According to an aspect of at least one example embodiment, there is provided an audio record management method performed by a computer apparatus including at least one processor configured to execute computer-readable instructions included in a memory, where the audio record management method includes using the at least one processor for creating an audio record by converting an audio of a video communication channel to a text; and for providing the audio record to a user that participates in the video communication channel.

The audio record management method may further include using the at least one processor for allowing a chatbot account for audio record management to participate in the video communication channel to connect with the video communication channel.

The providing step may include providing the audio record through a chatroom of a messenger linked with an audio record management service.

The providing step may include providing the audio record as a text-type message through a messenger chatroom that includes the chatbot account.

The providing step may include providing the audio record in the form of a text file through a messenger chatroom that includes the chatbot account.

The creating step may include receiving a file in which the audio is recorded from a device of a user that invites the chatbot account to the video communication channel and converting audio data corresponding to a speaker utterance section to a text.

The audio record management method may further include using the at least one processor for managing a memo written during recording of the audio in the device by matching the memo to the audio record. The providing step may include providing the audio record in association with the memo.

The managing step may include matching and managing the memo written during recoding of the audio based on a timestamp of the audio record.

The step of providing in association with the memo may include displaying the audio record and the memo by chronologically matching the audio record and the memo based on a timestamp.

The step of providing in association with the memo may include jointly displaying the audio record and the memo through a dual view scheme.

According to an aspect of at least one example embodiment, there is provided a non-transitory computer-readable record medium storing instructions that, when executed by a processor, cause the processor to computer-implement the audio record management method.

According to an aspect of at least one example embodiment, there is provided a computer apparatus including at least one processor configured to execute computer-readable instructions included in a memory. The at least one processor includes an audio record creator configured to create an audio record by converting an audio of a video communication channel to a text; and an audio record provider configured to provide the audio record to a user that participates in the video communication channel.

According to some example embodiments, it is possible to expand a service use and to improve user convenience by automatically recording conversational speech, between multiple users, of a video communication channel as a text through speech recognition technology in connection with a video communication service such as a video call or a video conference.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIGS. 5 to 13 illustrate examples of a user interface screen for managing an audio record according to at least one example embodiment.

Figure 1:
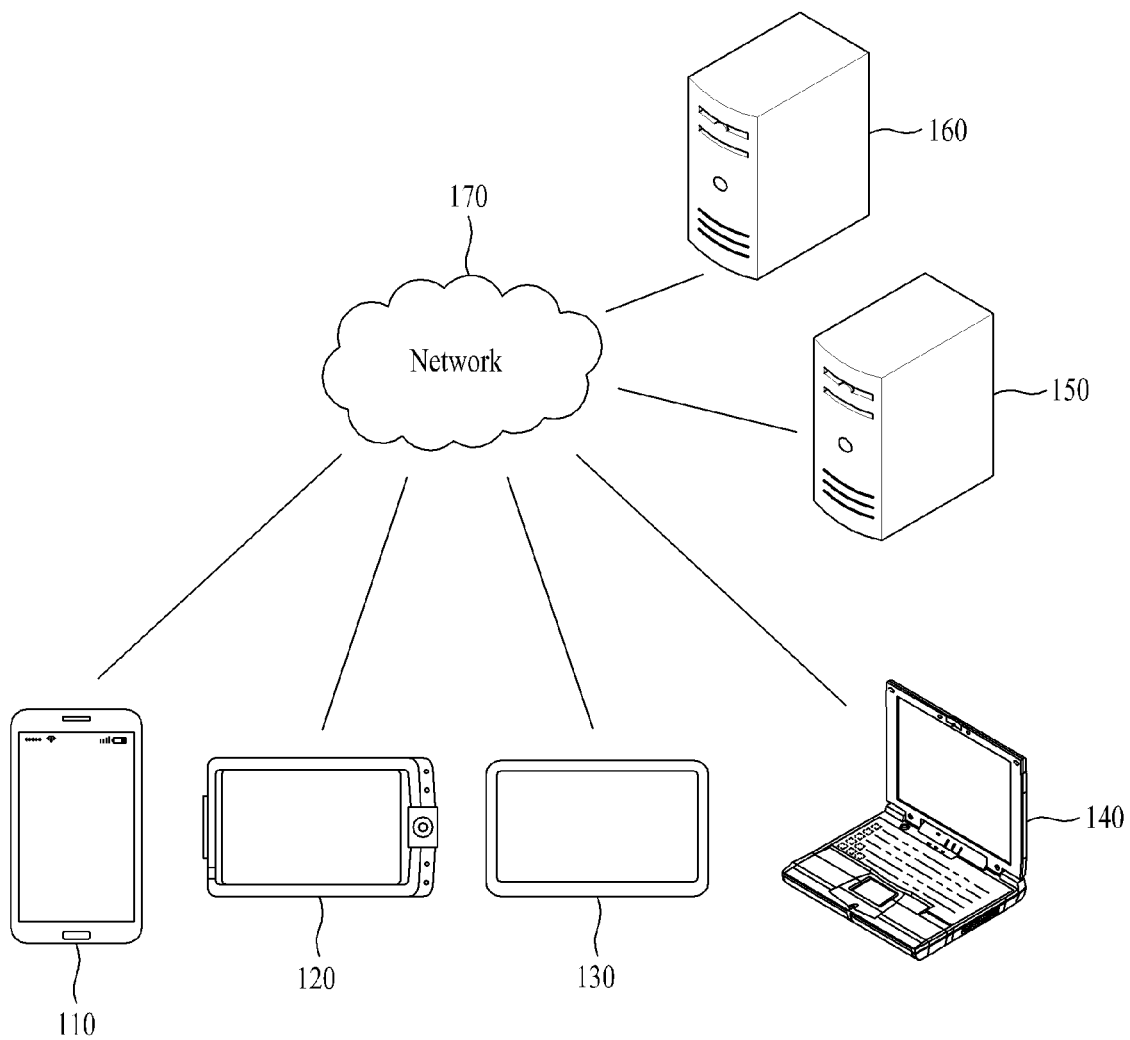
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An audio record management system according to the example embodiments may be implemented by at least one computer apparatus, and an audio record management method according to the example embodiments may be performed through at least one computer apparatus included in the audio record management system. Here, a computer program according to an example embodiment may be installed and run on the computer apparatus. The computer apparatus may perform the audio record management method according to the example embodiments under control of the executed computer program. The computer program may be stored in a non-transitory computer-readable record medium to computer-implement the audio record management method in conjunction with the computer program.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices and the number of servers is not limited to those shown in the figure. Also, the network environment of FIG. 1 is provided as an example only among environments applicable to the example embodiments. The environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may each consist of a smartphone, a mobile phone, a navigation device, a computer, a laptop computer, a digital broadcasting terminal, a personal digital assistant (PDA), a portable multimedia player (PMP), a tablet PC, or the like. For example, although FIG. 1 illustrates the shape of a smartphone as an example of the electronic device 110, the electronic device 110 used herein may be any one of various types of physical computer apparatuses capable of communicating with other electronic devices 120, 130, and 140, and/or the servers 150 and 160 over the network 170 in a wireless or wired communication manner.

The communication scheme is not limited, and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of various network topologies that include a personal area network (PAN), a local area network (LAN), a campus area network (CAN), a metropolitan area network (MAN), a wide area network (WAN), a broadband network (BBN), and the Internet. Also, the network 170 may include at least one of various network topologies that include a bus network, a star network, a ring network, a mesh network, a star-bus network, a tree or hierarchical network, and the like. However, these network topologies are provided as examples only, and other types of networks may also be used.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. For example, the service may include an audio record management service (or a minutes management service), a content providing service, a group call service (or an audio conference service), a messaging service, a mail service, a social network service, a map service, a translation service, a financial service, a payment service, and a search service.

Figure 2:
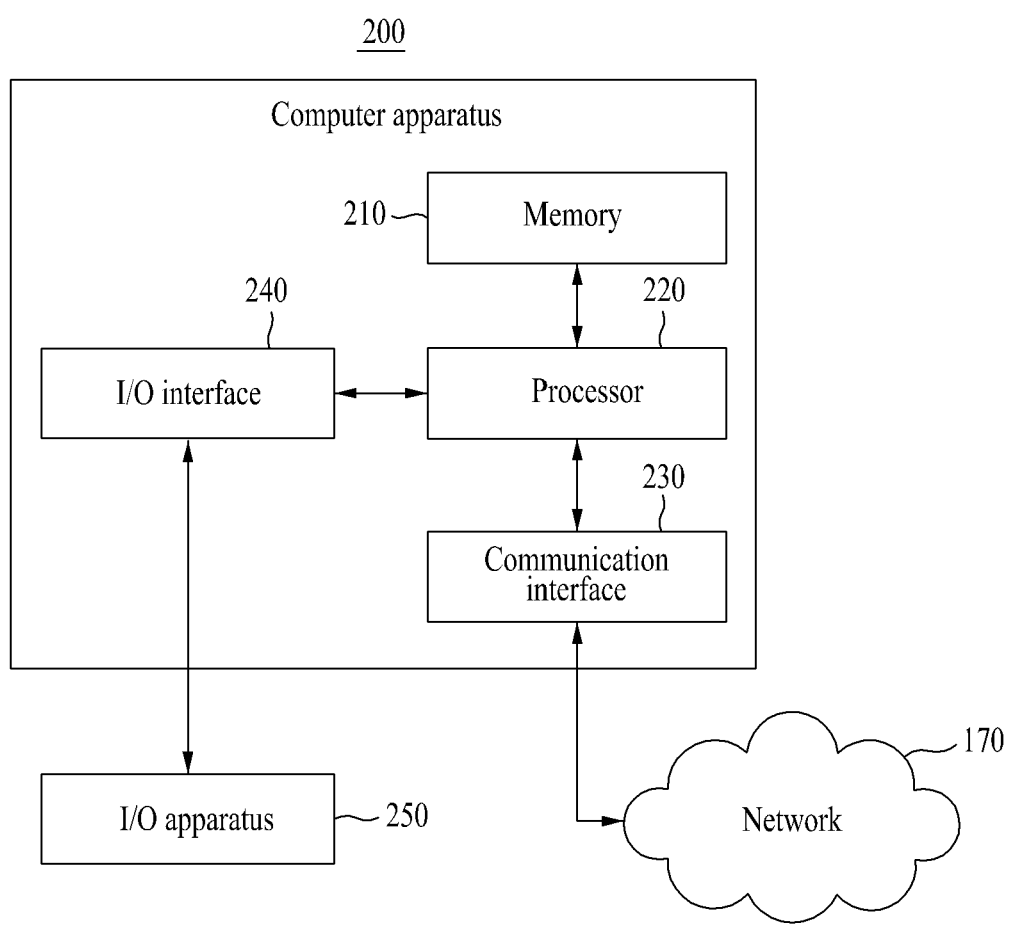
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an Operating System (OS) and at least one program code may be stored in the memory 210. Such software components may be loaded to the memory 210 from another non-transitory computer-readable record medium separate from the memory 210. The other non-transitory computer-readable record medium may include a non-transitory computer-readable record medium, such as, for example, a floppy drive, a disk, a tape, a DVD/CD-ROM drive, a memory card, etc. According to other example embodiments, software components may be loaded to the memory 210 through the communication interface 230, instead of through the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus, for example, the aforementioned storage devices. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, content, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database.

Hereinafter, example embodiments of a method and system to record a conversation in connection with a video communication service are described.

In general, a service is provided that records audio, for example, speech, during a face-to-face meeting or uploads an audio file and converts the corresponding audio, for example, speech, to a text.

In a video conference or a video call (i.e., not a face-to-face meeting), there is a difficulty in recording and managing a conversation between multiple users.

To overcome the above issues, the example embodiments provide an audio record management service that may provide a result of converting a conversational speech through a video communication service to a text (hereinafter, simply an "audio record") in connection with the video communication service such as a video call or a video conference.

Figure 3:
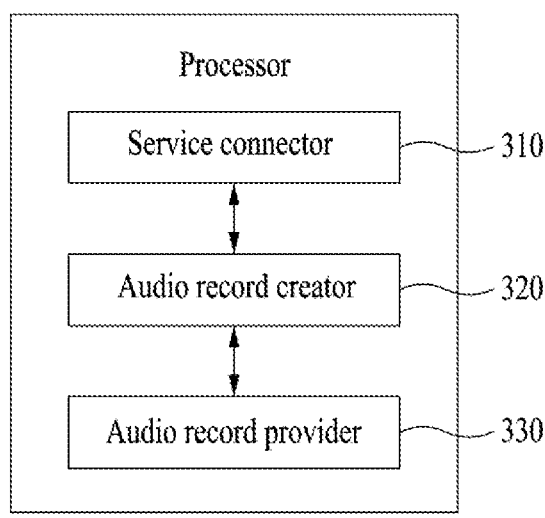
FIG. 3 is a diagram illustrating an example of a component includable in a processor of a computer apparatus according to at least one example embodiment.
Figure 4:
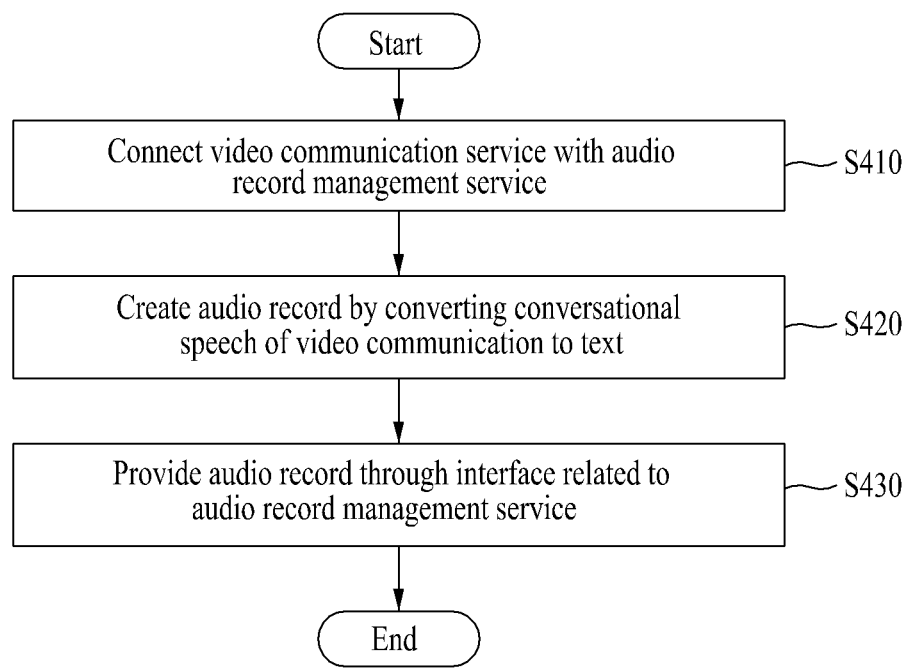
FIG. 4 is a flowchart illustrating an example of a method performed by a computer apparatus according to at least one example embodiment.

FIG. 3 is a diagram illustrating an example of components includable in a processor of a computer apparatus according to at least one example embodiment, and FIG. 4 is a flowchart illustrating an example of a method performed by a computer apparatus according to at least one example embodiment.

The computer apparatus 200 according to the example embodiment may provide a client with an audio record management service through a dedicated application installed on the client and a dedicated website/mobile site related to the computer apparatus 200. An audio record management system implemented as a computer may be configured in the computer apparatus 200. For example, the audio record management system may be implemented in the form of a program that independently operates or it may be implemented in an in-app form of a specific application e that is operable on the specific application. For example, a note app that is an app dedicated to audio record management may be implemented in an in-app form of a messenger app that provides a video call function or a video conference function, or it may be implemented as a separate independent app that connects with, that is, interacts, with the messenger app.

Referring to FIG. 3, to perform the audio record management method of FIG. 4, the processor 220 of the computer apparatus 200 may include a service connector 310, an audio record creator 320, and an audio record provider 330. Depending on example embodiments, the components of the processor 220 may be selectively included in or excluded from the processor 220. Also, depending on example embodiments, the components of the processor 220 may be separated or merged for representations of functions of the processor 220.

The processor 220 and the components of the processor 220 may control the computer apparatus 200 to perform operations S410 to S430 included in the audio record management method of FIG. 4. For example, the processor 220 and the components of the processor 220 may be configured to execute an instruction according to the code of at least one program and the code of the OS included in the memory 210.

Here, the components of the processor 220 may be considered as representations of different functions of the processor 220 performed by the processor 220 in response to an instruction provided from the program code stored in the computer apparatus 200. For example, the service connector 310 may be considered as a functional representation of the processor 220 that controls the computer apparatus 200 to control a connection with the video communication service in response to the instruction.

The processor 220 may read a necessary instruction from the memory 210 to which instructions associated with control of the computer apparatus 200 have been loaded. In this case, the read instruction may include an instruction for controlling the processor 220 to perform the following operations: S410 to S430.

It should be noted that the operations S410 to S430 may be performed in an order that is different from the order illustrated in FIG. 4, and that a portion of the operations S410 to S430 may be omitted, or that one or more additional process(es) may be further included.

Referring to FIG. 4, in operation S410, the service connector 310 may connect an audio record management service with a video communication service. For example, the service connector 310 may connect with, that is, interact with, the video communication service by allowing a chatbot account related to the audio record management service (hereinafter, referred to as an audio record chatbot) to participate in a video communication channel. In a participant invitation process for video communication, the audio record chatbot may be invited as a single user that participates in the video communication. The service connector 310 may connect the video communication channel in which the audio record chatbot participates with the audio record management service through the audio record chatbot.

In operation S420, the audio record creator 320 may create an audio record by receiving conversational speech of the video communication channel connected with the audio record management service, and by converting the received audio to a text. Recording of the conversational speech of the video communication channel may be performed in a device of a user (hereinafter, referred to as a master) that invites at least one user, such as, for example, an audio record chatbot, among other users participating in the video communication. The audio record creator 320 may receive an audio file recorded as the conversational speech of the video communication channel from a device of the master. The audio record creator 320 may receive a recorded file at a predetermined (or, alternatively, desired) time unit (such as, for example, every 5 minutes) or it may receive the entire recorded file after the video communication has been terminated. The audio record creator 320 may create an audio record that is the result of converting audio data corresponding to an utterance section by a speaker in the recorded file to a text using known speech recognition technology. Here, the audio record creator 320 may apply speaker segmentation technology for segmenting an utterance section for each speaker in a process of creating the audio record. In a situation in which a plurality of speakers each utter out of a predetermined order, the audio record creator 320 may segment and automatically record the contents of the utterance corresponding to conversational speech for each speaker.

The audio record creator 320 may receive a memo written during the process of recording the conversational speech of the video communication channel from the device of a master, and may manage the memo by matching the memo to the audio record. The audio record creator 320 may match the audio record and the memo written during recording based on a time at which recording is in progress. The audio record may include a timestamp that represents a starting point of a speaker utterance section and the audio record creator 320 may also manage a memo written in a corresponding section based on the timestamp of the audio record. That is, the audio record creator 320 may match and manage a memo written in an utterance section of a specific point in time with an audio record of the corresponding specific point in time.

A note app that is a dedicated audio record management app may be installed in the device of the master. A device that records the conversational speech of the video communication channel may refer to a device in which the note app is installed, and may correspond to the device that is connected with the video communication channel. A device that creates a memo in association with the conversational speech of the video communication channel may be the same device as the device that records the conversational speech, or it may be another device used by the master. Through linkage between a mobile app (a note app) and a PC web (a website dedicated for the audio record management service) that are logged in with the same account by the master, a use environment may be applied in which recording of conversational speech is performed in a mobile device participating in video communication through the note app and a memo is created in a web accessed by a PC in relation to the conversational speech being recorded. However, the use environment provided above is an example only, and other use environments are contemplated.

In operation S430, the audio record provider 330 may provide an interface related to the audio record management service such that a user participating in the video communication may verify the audio record in which the conversational speech of the video communication channel is converted to the text. For example, the audio record provider 330 may provide the audio record through the mobile app (the note app) or the PC web dedicated for the audio record management service. For example, when an audio record is created, the audio record provider 330 may provide the audio record by including a text file corresponding to the audio record on a file list provided from the mobile app or the PC web. As another example, when an audio record is created, the audio record provider 330 may provide the audio record through a chatroom of a messenger linked with the audio record management service. For example, the audio record provider 330 may transmit a text corresponding to an audio record in the form of a text message or in the form of a file to a chatroom with the audio record chatbot.

FIGS. 5 to 13 illustrate examples of a user interface screen for managing an audio record according to at least one example embodiment.

Figure 6:
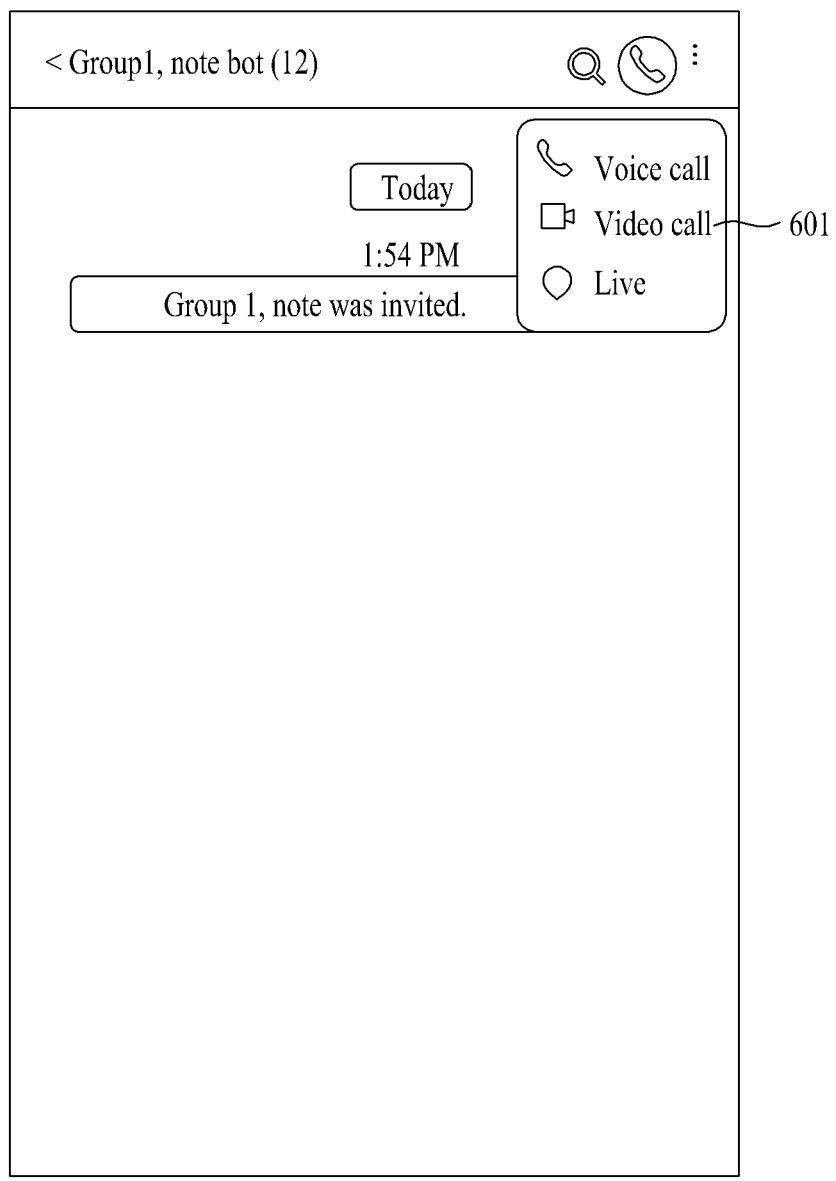
Figure 7:
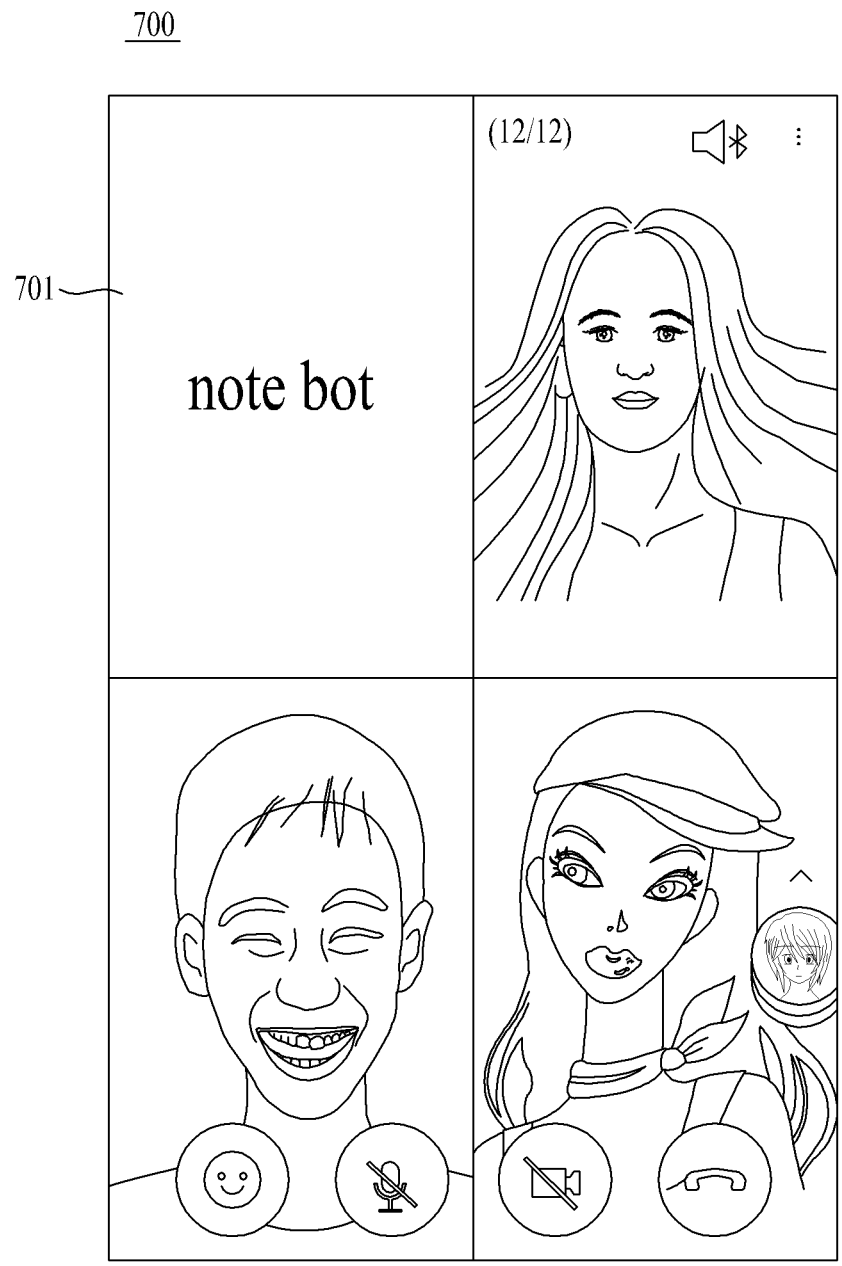

FIGS. 5 to 7 illustrate examples of a user interface screen to describe a process in which an audio record chatbot participates in a video communication according to at least one example embodiment.

Referring to FIG. 5, a note app installed in a mobile device may connect with, that is, interact with, a messenger app having a video communication function such as a video call or a video conference. Here, the messenger app may provide a friend list 500 by including a chatbot related to the note app, that is, an audio record chatbot 501 (note bot) in the friend list 500.

A user of the mobile device may select a participant for video communication using the friend list 500 on the messenger app, and may invite the audio record chatbot 501 as a single user that participates in the video communication.

Referring to FIG. 6, the messenger app may create a chatroom 600 in which a participant selected from the friend list 500 is a chat partner. Here, the chatroom 600 may include a "Video call" menu 601 for a video call as an example of video communication.

Referring to FIG. 7, in response to a selection on the "Video call" menu 601 in the chatroom 600, the chatroom 600 may be switched to a video call screen 700 to provide a video call between participants included in the chatroom 600.

An individual video received from a device of each participant may be included in the video call screen 700, as can be seen in FIG. 7. In the case of the audio record chatbot 501, a video 701 related to the audio record chatbot 501 may be disposed as a chatbot video. Depending on example embodiments, the video 701 related to the audio record chatbot 501 may be omitted from the view shown on the video call screen 700, and the view may show only the other participants.

Although it has been described that the audio record chatbot 501 was invited in a process of creating the chatroom 600, such a description is provided as an example only, and a scheme or a process of inviting the audio record chatbot 501 may be readily modified. In a participant invitation process for video communication, the audio record chatbot 501 may be invited. Also, the audio record chatbot 501 may be invited as an additional participant by any one user that is participating in the video communication during the video communication.

As the audio record chatbot 501 participates in the video communication using the messenger app, the conversational speech of the video communication channel may be recorded in the note app.

Figure 8:
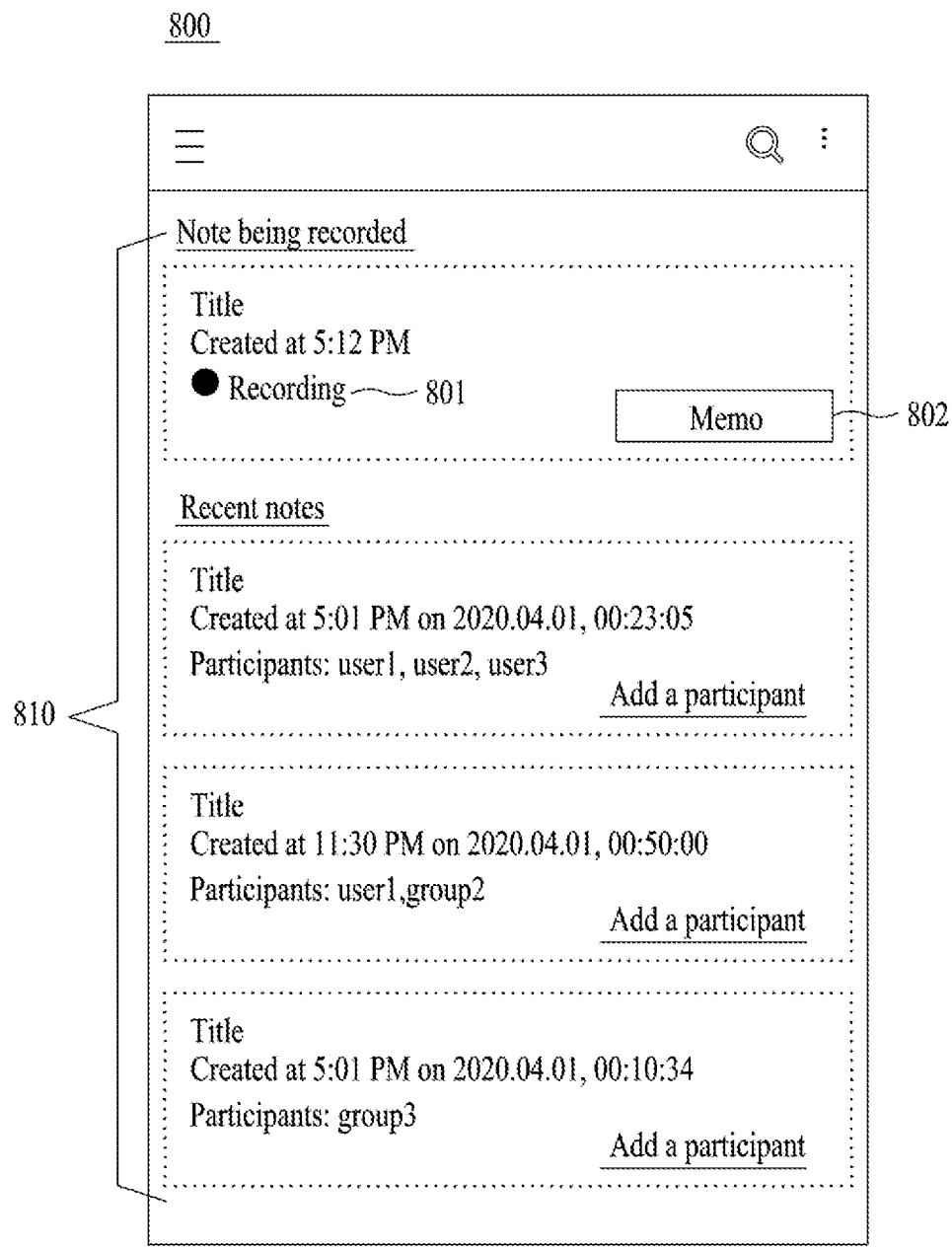

FIG. 8 illustrates an example of an audio record management screen 800 as an interface screen of a note app according to at least one example embodiment. An audio file list 810 created as an audio record may be included in the audio record management screen 800, and status information 801 indicating that conversational speech of a video communication channel is being recorded as connection information, that is, interaction information with a messenger app.

Also, as the video communication is in progress on the messenger app, a "Memo" list 802 for writing a memo for an audio file being recorded may be provided on the audio record management screen 800. In response to a selection on the "Memo" menu 802, a mobile device may provide a memo creation screen (not shown). Here, the memo creation screen may include a text-based input, a photo or video capturing function, and a file attachment function as an interface for writing a memo. Also, the memo creation screen may further include a bookmark interface capable of recording a bookmark in an audio file being recorded in the mobile app. When a memo is written on the memo creation screen, a timestamp may be displayed based on a recording time of a corresponding audio file being recorded in the mobile app for each memo.

Although it has been described that the "Memo" menu 802 for entering the memo creation screen is provided, it is provided as an example only. Depending on example embodiments, instead of providing the "Memo" menu 802 as a separate menu, the memo creation screen may be included in a details screen that is entered by selecting a specific audio file, such as, for example, an audio file being recorded from the audio file list 810.

The processor 220 (FIG. 2) may receive the audio file in which the conversational speech of the video communication channel is recorded from the mobile device through the note app, and may create the audio record. Also, the processor 220 may receive a memo created in the process of recording the conversational speech of the video communication channel from the mobile device, and may manage the memo by matching the memo to the audio record.

When the video communication is completed, the processor 220 may provide the audio record in which the conversational speech is converted to the text in a form to be verifiable by a user that participates in the corresponding video communication.

Figure 9:
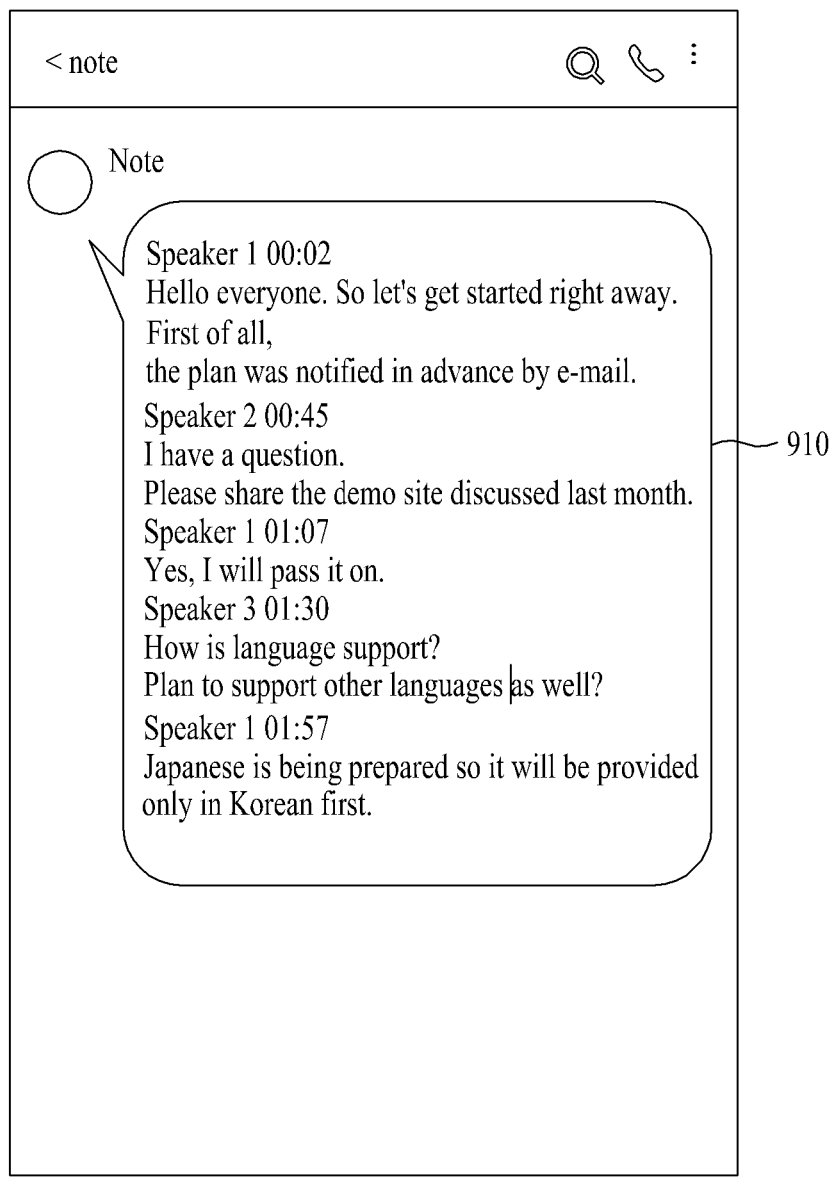

For example, referring to FIG. 9, the processor 220 may provide a full text corresponding to an audio record as a text-type message 910 through a chatroom 900 with an audio record chatbot. That is, the processor 220 may transmit the text of the entire audio record to the chatroom 900 with the audio record chatbot.

Figure 10:
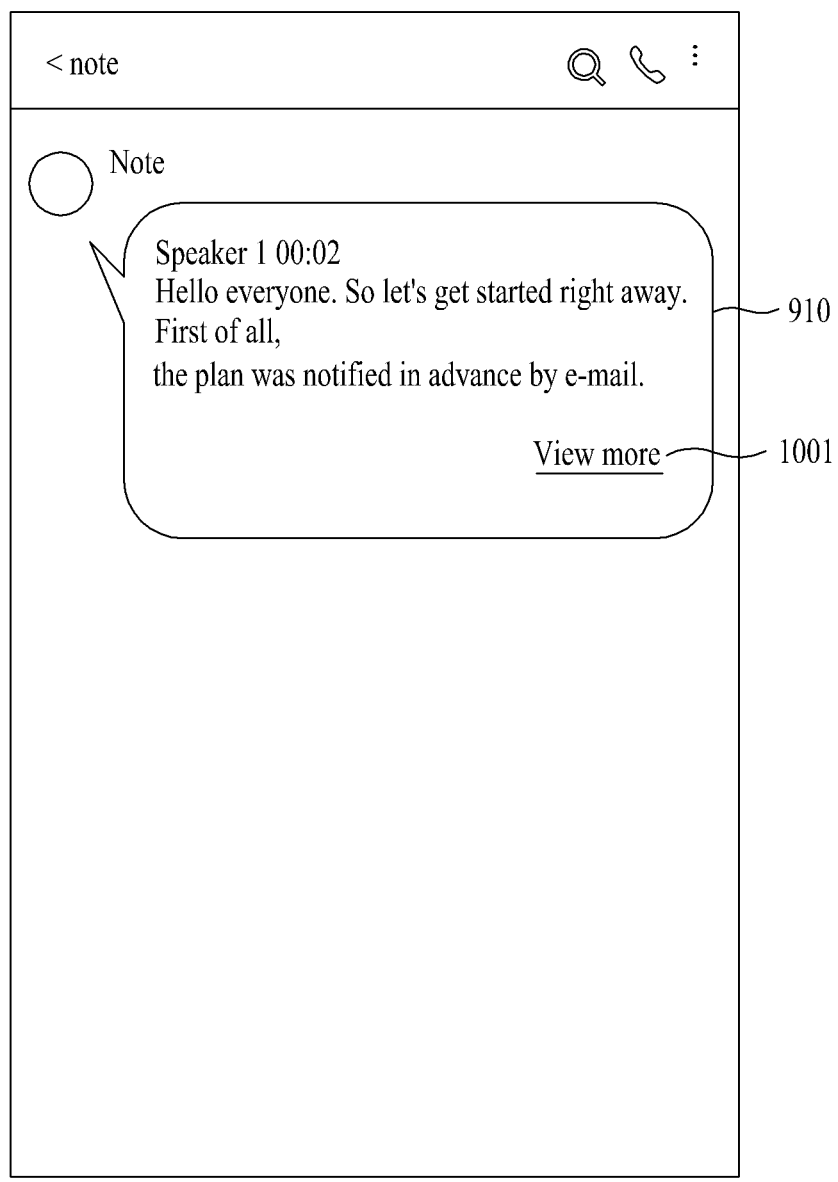

As another example, referring to FIG. 10, the processor 220 may provide only a portion of the text of the audio record as the text-type message 910 through the chatroom 900 with the audio record chatbot, and here, may also provide a "View more" menu 1001 capable of allowing viewing of the full text. The "View more" menu 1001 may include a link for moving to a detailed screen of the corresponding audio record in response to execution of the note app.

Figure 11:
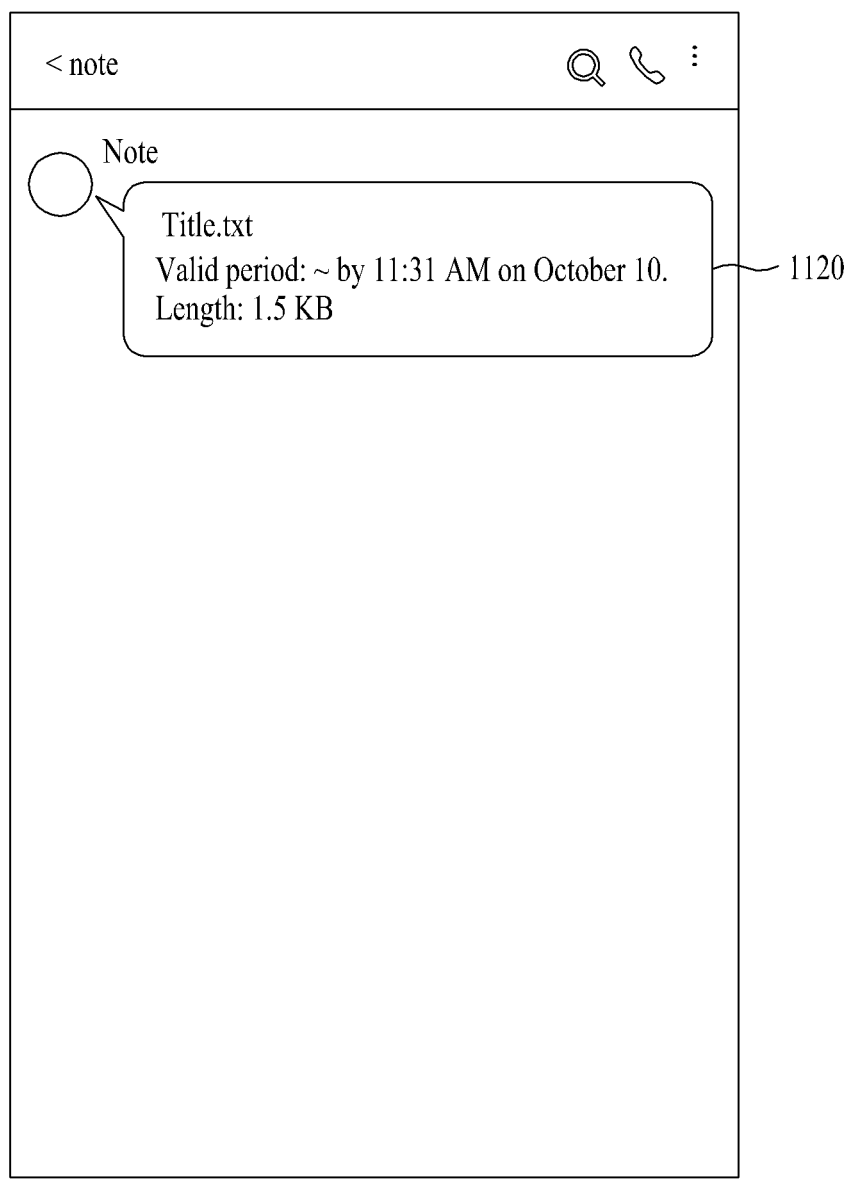

As another example, referring to FIG. 11, the processor 220 may provide a download link type of message 1120 that includes a link capable of downloading a corresponding audio record as a file through the chatroom 900 with the audio record chatbot. That is, the processor 220 may transmit the audio record in a form of a text file to the chatroom 900 with the audio record chatbot.

Figure 12:
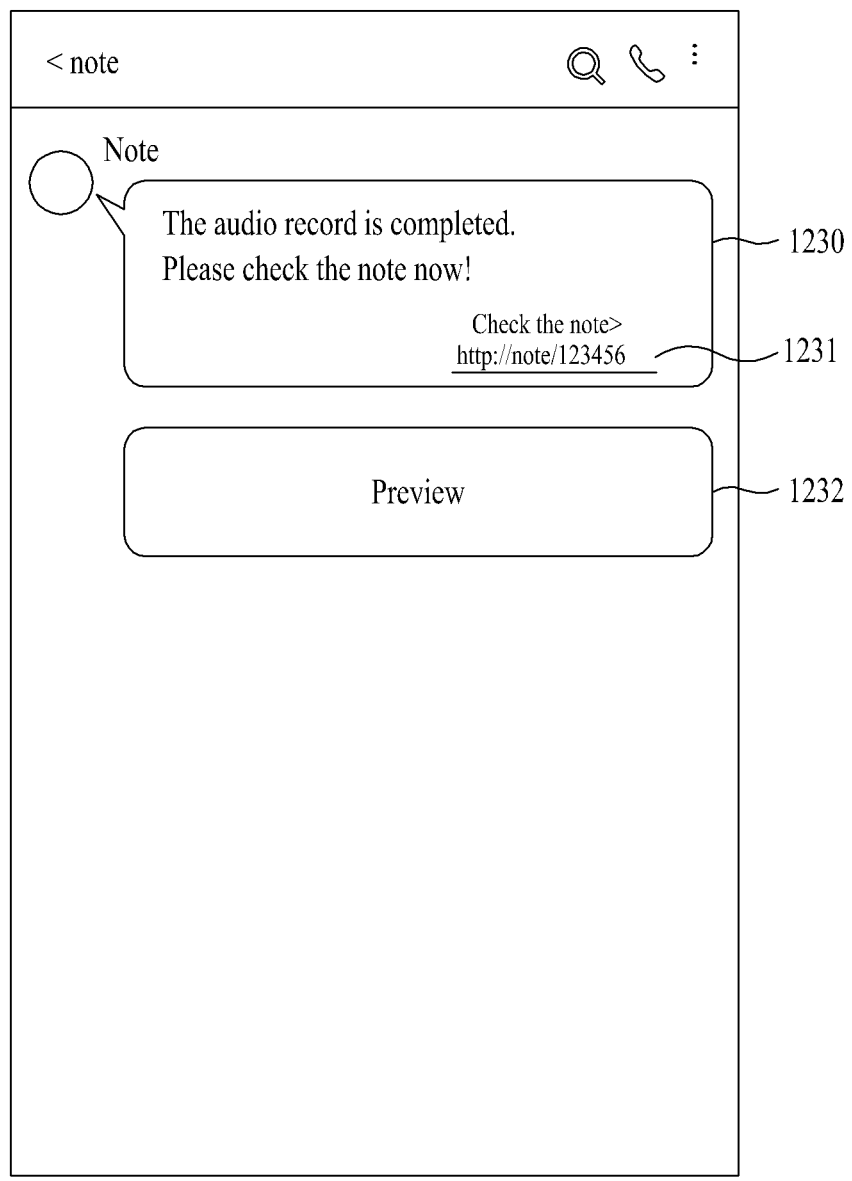

As another example, referring to FIG. 12, the processor 220 may provide a message 1230 that includes a service page directing link 1231 for moving to a service screen that provides a corresponding audio record through the chatroom 900 with the audio record chatbot. The processor 220 may provide a preview 1232 for at least a portion of the audio record with the message 1230 of a service interacting link type.

Figure 13:
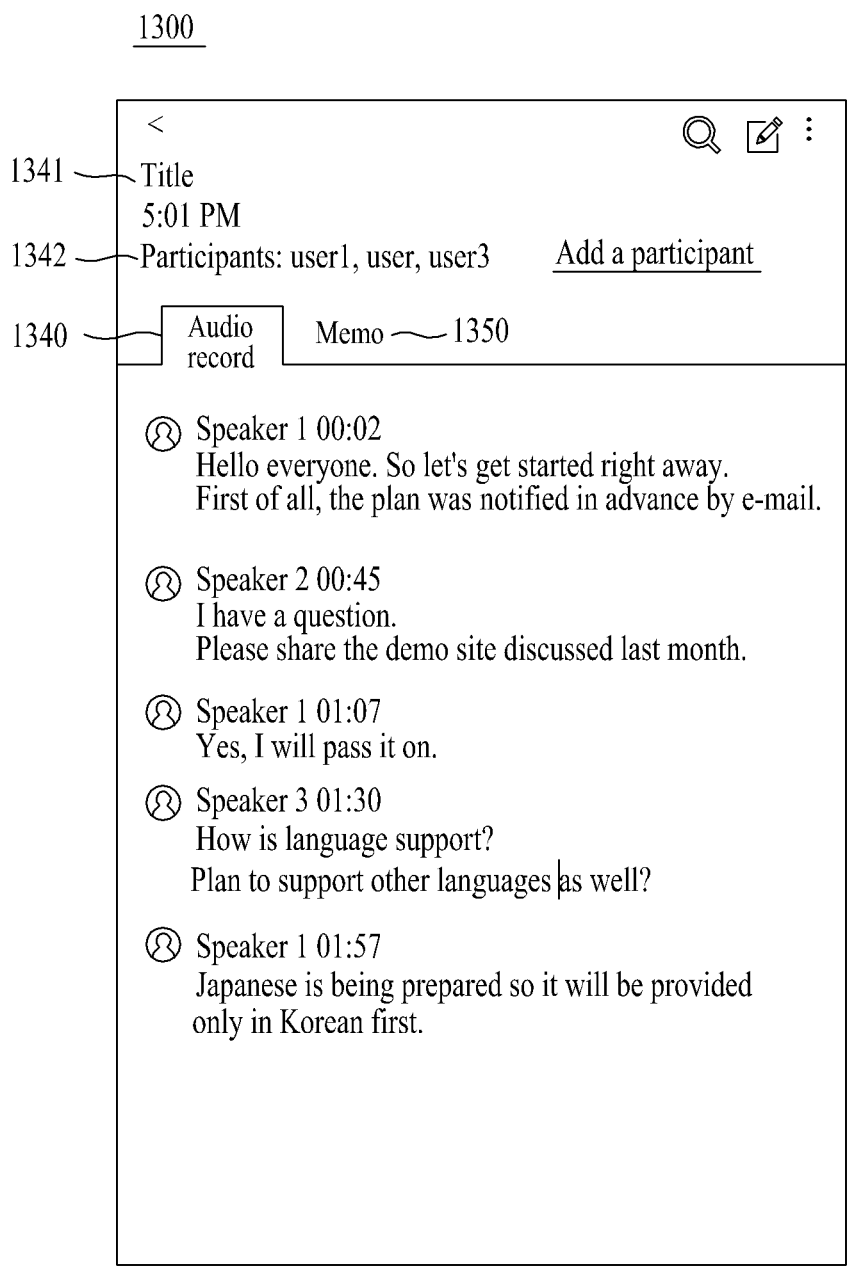

FIG. 13 illustrates an example of a detailed audio record screen 1300 according to at least one example embodiment.

In response to receiving an instruction to select a specific audio record, the processor 220 may provide the corresponding audio record in association with a memo matched to the audio record. Referring to FIG. 13, in response to a selection of the specific audio record from the audio file list 810 displayed on the audio record management screen 800, or in response to a selection on the "View more" menu 1001 or the service page directing link 1231 in the chatroom 900, the processor 220 provides the detailed audio record screen 1300 corresponding to a view mode for the corresponding audio record.

The processor 220 may display an audio record area 1340 and a memo area 1350 on the detailed audio record screen 1300. A title 1341 and participant information 1342 of the audio record may also be displayed on the detailed audio record screen 1300.

The processor 220 may provide the audio record area 1340 and the memo area 1350 as separate individual tab pages on a single screen. As another example, the processor 220 may display the audio record area 1340 and the memo area 1350 in a dual view scheme according to an aspect ratio of the mobile device.

A text converted from an audio of a corresponding section may be displayed on the audio record area 1340 for each section. Here, a timestamp may be displayed based on a point in time at which a text is uttered in a corresponding audio file. A memo that is written during recording of the audio file may be displayed on the memo area 1350. Here, for each memo, a recording progress time at a time at which a corresponding memo starts to be written may be displayed as a timestamp of the corresponding memo.

In the case of providing the audio record area 1340 and the memo area 1350 in a dual view scheme, the processor 220 may display in parallel the audio record area 1340 and the memo area 1350 in two columns. Here, the processor 220 may chronologically match and display the audio record area 1040 and the memo area 1050 based on the timestamp. For example, the processor 220 may display a memo written at 00:02 at which Speaker 1 made an utterance in line with a text of a corresponding utterance section.

In the case of providing the audio record area 1340 and the memo area 1350 as individual tab pages, the processor 220 may simply arrange the audio record area 1340 and the memo area 1350 in chronological order without aligning the audio record area 1340 and the memo area 1350 on the same line based on a time stamp.

According to some example embodiment, it is possible to expand a service use and to improve a user convenience by automatically recording a conversational speech of a video communication channel as a text through speech recognition technology in connection with a video communication service such as a video call or a video conference.

The apparatuses described herein may be implemented using hardware components, software components, and/or a combination thereof. For example, a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An audio record management method performed by an audio record management service via a computer apparatus comprising at least one processor configured to execute computer-readable instructions included in a memory, the audio record management method, which is performed by the at least one processor, comprising:
   connecting with, by the at least one processor, a video communication channel via an account for recording audio of the video communication channel through the audio record management service;
   creating an audio record by converting the audio of the video communication channel to a text, wherein the creating comprises receiving a file in which the audio is recorded from a device of a user that invites a chatbot account to the video communication channel and converting audio data corresponding to a speaker utterance section to a text; and
   managing a memo written during recording of the audio in the device by matching the memo to the audio record,
   after a video communication through the video communication channel is terminated, providing the audio record to a webpage or a source associated with a mobile application such that a user who has been participating in the video communication is able to review the audio record through the webpage or the mobile application, wherein the providing comprises providing the audio record in association with the memo, and further wherein the providing in association with the memo comprises jointly displaying the audio record and the memo through a dual view scheme,
   wherein the webpage or the mobile application is separated from a video communication service to provide the video communication through the video communication channel, and
   wherein the connecting comprises:
   allowing the chatbot account as the account for audio record management to participate in the video communication channel to connect with the video communication channel,
   wherein the video communication channel is connected to the audio record management service through the chatbot account,
   wherein the webpage or the source includes an audio record management screen, and the audio record management screen displays: (i) status information indicating that the audio of the video communication channel is being recorded, and (ii) a memo interface for receiving the memo regarding the audio of the video communication channel being recorded,
   wherein the providing comprises providing, through a chatroom of a messenger where the chatbot account participates in, i) a message from the chatbot account including a link to a service page of the audio record management service to provide the audio record and ii) a preview user interface to provide a portion of the audio record through the chatroom.

2. The audio record management method of claim 1, wherein the providing comprises providing the audio record through the chatroom of the messenger linked with the audio record management service.

3. The audio record management method of claim 1, wherein the providing comprises providing the audio record as a text-type message through a messenger chatroom that includes the chatbot account.

4. The audio record management method of claim 1, wherein the providing comprises providing the audio record as a form of a text file through a messenger chatroom that includes the chatbot account.

5. The audio record management method of claim 1, wherein the managing comprises matching and managing the memo written during recoding of the audio based on a timestamp of the audio record.

6. The audio record management method of claim 1, wherein the providing in association with the memo comprises displaying the audio record and the memo by chronologically matching the audio record and the memo based on a timestamp.

7. A non-transitory computer-readable record medium storing instructions that, when executed by a processor, cause the processor to computer-implement the audio record management method of claim 1.

8. A computer apparatus comprising:
   at least one processor configured to function as an audio record management service by executing computer-readable instructions included in a memory,
   wherein the at least one processor comprises:
   an audio record creator configured to create an audio record by converting audio of a video communication channel to a text, wherein the audio record creator is configured to receive a file in which the audio is recorded from a device of a user that invites a chatbot account to the video communication channel and to convert audio data corresponding to a speaker utterance section to a text, and the audio record creator is configured to manage a memo written during recording of the audio in the device by matching the memo to the audio record, and further wherein an audio record provider is configured to provide the audio record in association with the memo; and
   the audio record provider is configured to provide the audio record to a user that participates in the video communication channel, and
   after a video communication through the video communication channel is terminated, the audio record provider provides the audio record to a webpage or a source associated with a mobile application such that a user who has been participating in the video communication is able to review the audio record through the webpage or the mobile application, and wherein the audio record provider provides the audio record in association with the memo by jointly displaying the audio record and the memo through a dual view screen, and
   wherein the webpage or the mobile application is separated from a video communication service to provide the video communication through the video communication channel, and
   wherein the computer apparatus further comprises:
   a service connector configured to allow the chatbot account as the account for audio record management to participate in the video communication channel to connect with the video communication channel,
   wherein the service connector connects the video communication channel to the audio record management service through the chatbot account, and
   wherein the webpage or the source includes an audio record management screen, and the audio record management screen displays: (i) status information indicating that the audio of the video communication channel is being recorded, and (ii) a memo interface for receiving the memo regarding the audio of the video communication channel being recorded,
wherein when the audio record provider provides the audio record, the audio record provider provides, through a chatroom of a messenger where the chatbot account participates in, i) a message from the chatbot account including a link to a service page of the audio record management service to provide the audio record and ii) a preview user interface to provide a portion of the audio record through the chatroom.

9. The computer apparatus of claim 8, wherein the audio record provider is configured to provide the audio record through the chatroom of the messenger linked with the audio record management service.

10. The computer apparatus of claim 8, wherein the audio record provider is configured to provide the audio record as a text type message through a messenger chatroom that includes the chatbot account.

11. The computer apparatus of claim 8, wherein the audio record provider is configured to provide the audio record as a form of a text file through a messenger chatroom that includes the chatbot account.

12. The computer apparatus of claim 8, wherein the audio record creator is configured to match and manage the memo written during recoding of the audio based on a timestamp of the audio record.

13. The computer apparatus of claim 8, wherein the audio record provider is configured to display the audio record and the memo by chronologically matching the audio record and the memo based on a timestamp.

* * * * *